Aug. 18, 1964     F. KAHN ETAL     3,144,904
HEAT TRAP FOR STORAGE WATER HEATERS
Filed May 4, 1962                 2 Sheets-Sheet 1
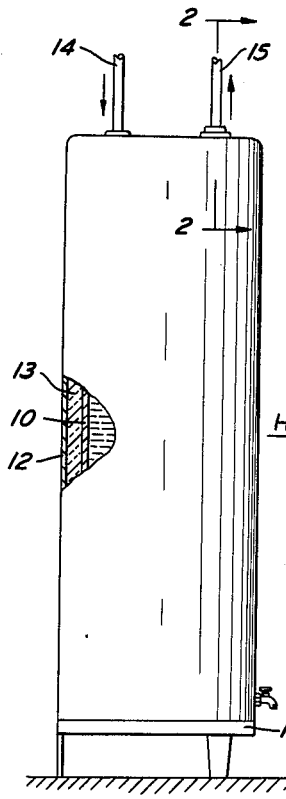
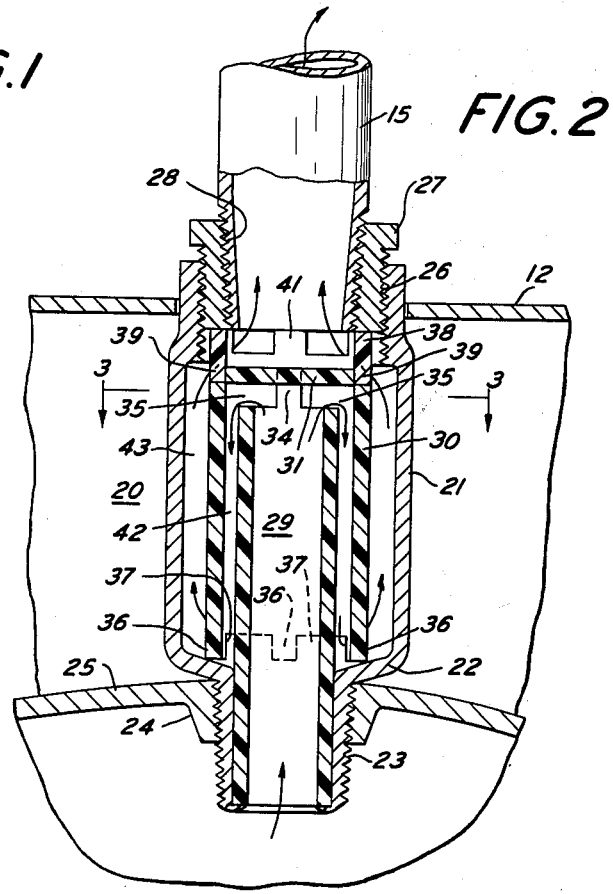
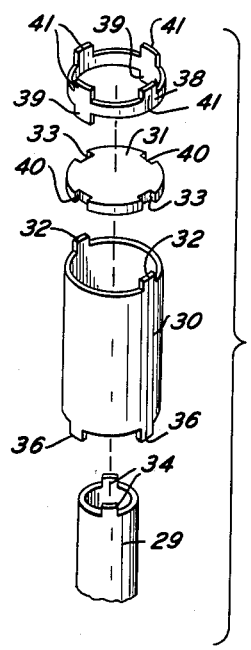
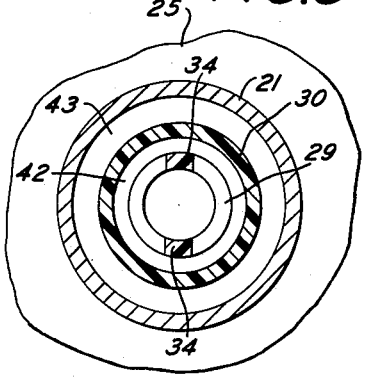
INVENTORS
FRANK KAHN
JAMES L. EVERETT, III
BY
ATTORNEY Aug. 18, 1964         F. KAHN ETAL         3,144,904
HEAT TRAP FOR STORAGE WATER HEATERS
Filed May 4, 1962                     2 Sheets-Sheet 2

INVENTORS
FRANK KAHN
JAMES L. EVERETT, III
BY
B.T. Wobensmith 2nd
ATTORNEY

United States Patent Office 3,144,904
Patented Aug. 18, 1964

3,144,904
HEAT TRAP FOR STORAGE WATER HEATERS
Frank Kahn, 1865 Edmund Road, Abington, Pa., and
James L. Everett III, 743 Mancill Road, Strafford, Pa.
Filed May 4, 1962, Ser. No. 192,589
8 Claims. (Cl. 165—73)

This invention relates to heat traps for storage water heaters.

It has heretofore been proposed to provide a heat trap for the hot water outlet of an electric storage water heater in order to minimize convection standby losses. The structure heretofore conventionally employed consisted in positioning the hot water outlet connection in the heater casing at a specified distance below the hot water opening in the tank. As a result of price competition, in many instances no heat traps have been used or ineffective heat traps have been substituted.

It is the principal object of the present invention to provide a heat trap which is of simple but effective construction, which may be made at low cost, and which may be easily employed with the various types of storage water heaters now in use.

It is a further object of the present invention to provide a heat trap for storage water heaters which can be made as a fitting for installation at the top of the tank on the hot water outlet pipe so as to cause a downward diversion of water before discharge.

It is a further object of the present invention to provide a heat trap for storage water heaters which in one form is adapted for top delivery of hot water, as demanded, and in another form is adapted for side outlet delivery of hot water, as demanded.

It is a further object of the present invention to provide a heat trap for storage water heaters which includes, as a component, a tubular plastic flow director and divider.

Other objects and advantageous features of the invention will be apparent from the description and claims.

The nature and characteristic features of the invention will be more readily understood from the following description, taken in connection with the accompanying drawings forming part thereof, in which:

FIGURE 1 is a side elevational view of an electric storage water heater with which the heat trap of the present invention is particularly adapted for use;

FIG. 2 is a vertical central sectional view, enlarged, and taken approximately on the line 2—2 of FIG. 1 showing a preferred form of fitting with a heat trap in accordance with the present invention;

FIG. 3 is a horizontal sectional view taken approximately on the line 3—3 of FIG. 2;

FIG. 4 is an exploded perspective view, on a smaller scale, of the internal elements of the fitting shown in FIGS. 2 and 3;

Figure 5:
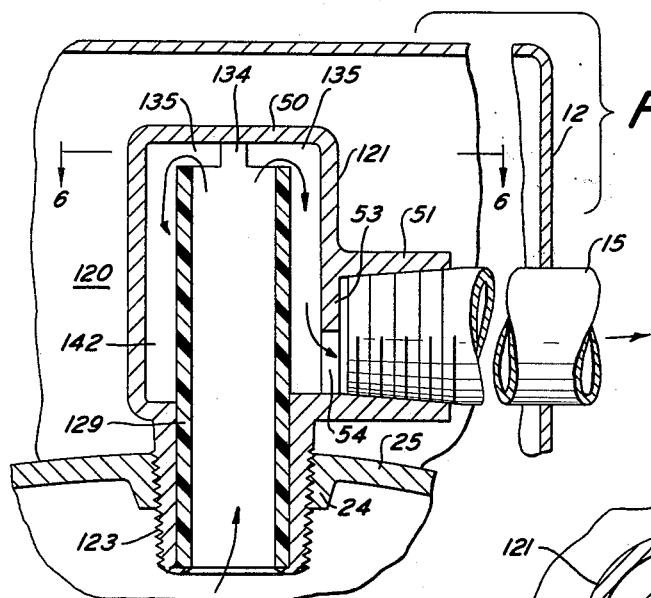
FIG. 5 is a vertical central sectional view of another preferred embodiment of the invention with a side delivery connection for the hot water.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, a storage water heater H, preferably for electric water heating, as shown in FIG. 1, preferably includes a tank 10 supported on a base 11 with an outer enclosing cover or jacket 12 and with insulation 13 interposed between the jacket 12 and the tank 10 for reducing heat loss. The tank 10 can be provided with a cold water inlet connection 14 and a hot water delivery connection 15, and is provided with a heat trap as hereinafter described.

Referring now more particularly to FIGS. 2, 3 and 4 of the drawings, the heat trap fitting 20 as there illustrated includes an outer cylindrical casing 21 which may be of brass or other non-corrosive material, with a lower inwardly extending wall portion 22 and a threaded nipple 23 extending therebelow and disposed in threaded engagement in a boss 24 in the top crown 25 of the heater tank 10.

The upper end of the casing 21 is preferably internally threaded as at 26 for the reception of a standard pipe bushing 27 with which the delivery pipe 15 for the hot water is in threaded engagement at 28.

Within the interior of the casing 21 an inner cylindrical sleeve 29 is provided, preferably in frictional engagement in the interior of the nipple 23, and extending to a location spaced downwardly from the upper internally threaded section 26 of the casing 21. The bottom of the nipple 23 is peened inwardly below the bottom of the sleeve 29 to prevent its downward displacement. The sleeve 29 is preferably made of thermal insulating material, suitably of plastic material capable of withstanding continuous exposure to hot water, such as polypropylene, cross-linked polyethylene, nylon, fluorocarbons, or the like.

In surrounding relation to the sleeve 29, an outer sleeve 30 is provided, the lower end of which rests upon the wall portion 22 and the upper end of which has a cover plate 31 extending thereover. The cover plate 31 is held in position by holding lugs 32 on the sleeve 30 which engage in peripheral slots 33 on the plate 31. The cover plate 31 and upper terminal end of the inner sleeve 29 are retained in spaced relation by spacer lugs 34 to provide flow passageways 35.

The lower end of the outer sleeve 30 preferably has a plurality of downwardly extending spacer lugs 36 to provide flow passageways 37 therebetween and a retainer ring 38 is provided which rests upon the cover plate 31. A plurality of downwardly extending locking lugs 39 are provided for engagement in notches 40 in the plate 31. The retainer ring 38 also has a plurality of upwardly extending lugs 41 with which the lower face of the pipe bushing 27 engages for retaining the ring 38, plate 31, and outer sleeve 30 in position. The cover plate 31 also holds sleeve 29 down against the inward peened bottom edge of nipple 23.

The outer sleeve 30 is in spaced relation to the inner sleeve 29 to provide a downflow passageway 42 with an upper boundary provided by the plate 31. The outer sleeve 30 is in spaced relation to the casing 21 to provide an upflow passageway 43. The downwardly directed or downflow passageway 42 between the inner sleeve 29 and outer sleeve 30 provides a flow path which is restricted in its transverse dimensions but is of adequate overall area to accommodate the flow. Although the outer sleeve assembly comprising sleeve 30, cover plate 31 and retainer ring 38 are shown as separate elements, it is to be understood that these may be formed or cast as a unitary outer sleeve element.

Figure 6:
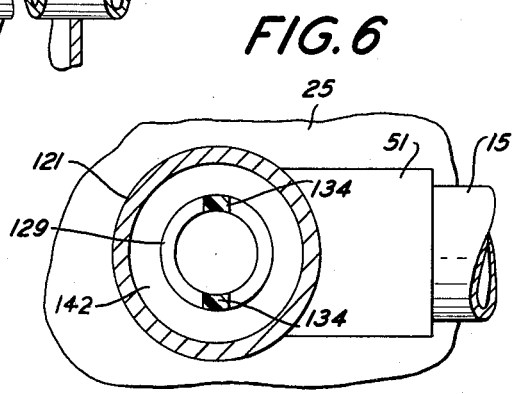
FIG. 6 is a horizontal sectional view taken approximately on the line 6—6 of FIG. 5.

Referring now more particularly to FIGS. 5 and 6 of the drawings the heat trap fitting 120 there shown includes a cylindrical casing 121 having a top closure wall 50 with an internally threaded side outlet pipe 51 in which a hot water delivery pipe 15 is in threaded engagement. The casing 121 has a downwardly extending threaded nipple 123 in threaded engagement in a boss 24 in the top crown 25 of the heater tank 10.

Within the interior of the casing 121 an interior sleeve 129 is provided extending downwardly and in engagement in the interior of the nipple 123. The sleeve 129 has one or more upwardly extending lugs 134 for spacing the upper terminus of the sleeve 129 downwardly from the wall 50 to provide passageways 135 for fluid flow. The sleeve 129 is held in place and prevented from downward displacement similarly as sleeve 29 of the device of FIGS. 2, 3 and 4.

The casing 121 has a wall portion 53 extending partly in closing relation to the side outlet pipe 51, with a passageway 54 around the lower edge of the wall portion 53.

The sleeve 129 is in spaced relation to the casing 121 to provide a downwardly directed fluid flow path 142 with an upper boundary provided by the wall 50 for fluid delivery to the outlet pipe 51.

Figure 7:
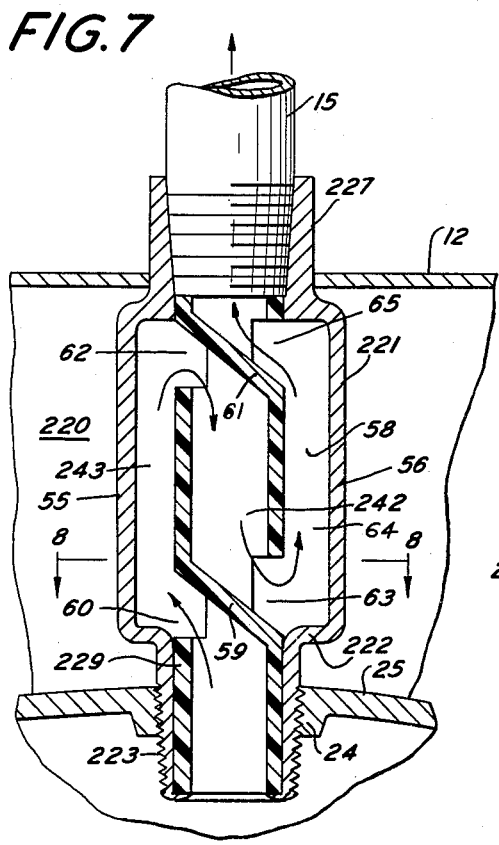
FIG. 7 is a vertical central sectional view of another preferred embodiment of the present invention for top delivery.
Figure 8:
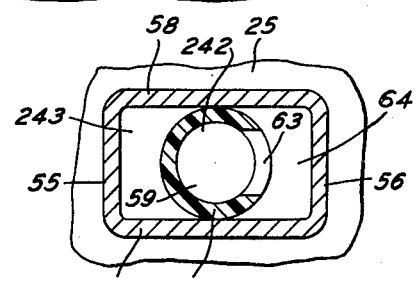
FIG. 8 is a horizontal sectional view taken approximately on the line 8—8 of FIG. 7.
Figure 9:
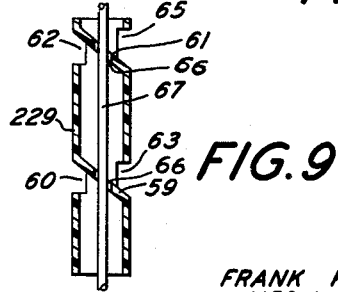
FIG. 9 is a modified form of insert as shown in FIGS. 7 and 8 with the stem of an immersion safety device inserted therein.

Referring now more particularly to FIGS. 7, 8 and 9 of the drawings the fitting 220 there shown has a casing 221 and a lower wall 222 with a downwardly extending threaded nipple 223 which is in threaded engagement in a boss 24 in the top crown 25 of the heater tank 10. The casing 221 has an upwardly extending internally threaded section 227 for the connection of the hot water delivery pipe 15.

The casing 221 is preferably of substantially rectangular cross-section with opposite end walls 55 and 56 and more closely spaced opposite side walls 57 and 58.

Within the interior of the casing 221 a circular tubular sleeve 229 is provided in engagement with the opposite walls 57 and 58 and extending downwardly and in engagement in the nipple 223. The sleeve 229 has a lower inclined partition 59 with an opening 60 on one side thereof for delivery of fluid from the nipple 223 to an upflow passageway 243 between the sleeve 229 and the end wall 55. The sleeve 229 has an upper inclined partition 61 with an opening 62 on the same side thereof as the opening 60 for connecting the passageway 243 with the interior of the sleeve 229 below the upper partition 61.

The sleeve 229 is held in place and prevented from downward displacement similarly as the internal sleeves of the device of FIGS. 2 to 6, inclusive.

The interior of the sleeve 229 between the partitions 59 and 61 provides a downflow passageway 242.

The sleeve 229 above the lower partition 59 has an opening 63 to another upflow passageway 64 between the sleeve 229 and the wall 56.

The sleeve 229 has an opening 65, above the upper partition wall 61 connecting the passageway 64 with the threaded section 227 and thus to the pipe 15.

Both inclined partitions 59 and 61 have their uppermost portions on the side of the sleeve 229 toward the upflow passage 243 and are inclined downwardly therefrom toward the upflow passageway 64, the openings 60 and 63 being on about the same leevl, with the opening 60 adjacent to the lower surface of the partition 59 and the opening 63 adjacent its upward surface. Also, the openings 62 and 65 are approximately on the same level, with the opening 62 adjacent the lower surface of the partition 61 and the opening 65 adjacent its upward surface.

In the modified form shown in FIG. 9 the tubular sleeve 229 is of the same character as that shown in FIGS. 7 and 8 but the partitions 59 and 61 have aligned central openings 66 for the reception of an immersion stem or sensing element 67 of an immersion safety device (not shown) such as a spillage-type temperature or temperature and pressure relief valve, or a gas shut-off valve, all these valves being well known and in use for many years with water heaters and being required in some areas.

The mode of operation will now be pointed out, reference first being had to the embodiment of the invention shown in FIGS. 2, 3 and 4.

During standby heating or standby storage of heated water in the tank 10, preparatory to subsequent draw, there is no supply of water through the pipe 14 or withdrawal of water through the pipe 15. In the absence of a heat trap thermal circulation of water will occur from the top of the tank.

In the embodiment of the invention shown in FIGS. 2, 3 and 4, the water in the downflow passageway 42 during standby, while cooling because of outward flow of heat through the sleeve 30 and the casing 31, will experience natural temperature stratification with the water being warmest at the top and becoming progressively cooler toward the bottom. Since warmer water cannot descend through colder water, this stratification in the passageway 42 thus acts as a convection stop. Any tendency of heated water to flow by convection outwardly beyond the passageways 35 is thus effectively checked. The total cross sectional area of the passageway 42 is sufficiently large and does not interpose any objectionable restriction to flow when a demand occurs and draw of heated water is effected.

In the form of the invention shown in FIGS. 5 and 6, a similar convection stop is provided by the downflow passageway 142 in which natural stratification occurs during standby due to heat exchange between the water therein and the casing 121.

In the embodiment of the invention shown in FIGS. 6 to 9, inclusive, the downflow passageway 242, in the interior of the tubular sleeve 229 containing water which is cooler at the bottom than at the top by virtue of the water at the bottom being in thermal exchange relation with the ouer wall 56 through the opening 63, provides the thermal flow barrier.

It will be noted that the use of a sleeve, such as the sleeves 29, 129 and 229, in the casing of a fitting provides a simple but effective structure for carrying out the purposes of the invention.

Although the internal sleeves 29, 129 and 229 have been shown as being frictionally engaged within their respective casings and prevented from being downwardly displaced by inward peening of the bottom of the lower threaded ends of these casings it is understood that other conventional means may be used for holding these sleeves in place, such as cementing them in place with an epoxy cement or the like.

It is to be understood that in order to provide optimum inhibition of thermal convection the sleeves 29, 129 and 229 are of thermal non-conducting material, whereas if these sleeves were of thermally conducting material the effectiveness of the heat trap would be somewhat depreciated by transfer of heat to the water in the outflow passageway by thermal conductance through the sleeve. Also, although the casing 21, 121 and 221 have been described as of metal, they may alternatively be of suitably strong thermally insulating material capable of withstanding hot water service, and also formed integrally with the respective internal sleeves.

We claim:

1. In a storage water heater system containing hot water and having a tank with a top water pipe connection, a heat trap fitting disposed vertically thereabove having a bottom water connection connected to said tank connection in convective heat transfer relation with the water in said tank under standby conditions and a water delivery pipe connection above said bottom connection, said heat trap fitting comprising a casing and an internal sleeve of thermal non-conducting material having a vertical water passageway therein, said casing being spaced from said sleeve to provide a second vertical water passageway between said casing and said sleeve, communicating with the passageway in said sleeve, and the water in said second passageway being in thermal exchange relation with the external environment of the casing providing natural temperature stratification of the water in said second passageway.

2. The system as defined in claim 1 in which said casing is metallic.

3. The system as defined in claim 1 in which the water delivery pipe connection of said heat trap fitting is vertically aligned above its bottom water pipe connection.

4. A heat trap fitting for storage water heater tanks comprising a metallic casing having a bottom water pipe connection for connection to the top of a tank and a water delivery pipe connection axially aligned above said bottom connection, an internal axial sleeve of thermal non-conducting material interposed between said bottom connection and said delivery connection, said casing being so shaped and spaced from said sleeve as to provide two opposed vertical passageways between said casing and said sleeve, means for directing water flow between said bottom connection and said delivery connection in a first direction in one of said passageways, then through said sleeve in the opposite direction and then through the other passageway in the first direction.

5. A heat trap fitting as defined in claim 4 in which said means comprises a respective partition in said sleeve adjacent each end thereof forming a barrier against longitudinal flow of water in said sleeve, and said sleeve having a respective opening below each partition communicating with one of said pasageways and a respective opening above each partition communicating with the other passageway.

6. A heat trap fitting for a storage water heater comprising a metallic casing surrounding a sleeve of thermal non-conducting material providing a vertical internal fluid passageway, said casing being spaced from said sleeve and providing between said casing and said sleeve a second vertical fluid passageway in communiction with said internal passageway at a location adjacent one end of said casing but otherwise thermally insulated from said internal passageway and said passageways being arranged for fluid flow in opposite directions.

7. A heat trap fitting as defined in claim 6 having water therein at a temperature sufficiently above the ambient temperature of the surrounding environment to provide interchange of heat between the water in said second passageway and said environment whereby to cause natural temperature stratification of the water in said second passageway.

8. A heat trap fitting as defined in claim 1 having means securing said sleeve in position in said casing.

References Cited in the file of this patent
UNITED STATES PATENTS

| | | |
|---|---|---|
| 792,804 | Williams | June 20, 1905 |
| 1,051,130 | Lattime | Jan. 21, 1913 |
| 1,676,237 | Baker | July 10, 1928 |
| 1,863,273 | Hofferbert | June 14, 1932 |
| 1,883,656 | Estock | Oct. 18, 1932 |
| 2,100,504 | Crosley et al. | Nov. 30, 1937 |
| 2,210,480 | Brice | Aug. 6, 1940 |